United States Patent [19]

Dias et al.

[11] Patent Number: 5,121,494
[45] Date of Patent: Jun. 9, 1992

[54] JOINING TWO DATABASE RELATIONS ON A COMMON FIELD IN A PARALLEL RELATIONAL DATABASE FIELD

[75] Inventors: Daniel M. Dias, Mahopac; Joel L. Wolf, Goldens Bridge; Philip S. Yu, Chappaqua, all of N.Y.

[73] Assignee: IBM Corporation, Armonk, N.Y.

[21] Appl. No.: 417,366

[22] Filed: Oct. 5, 1989

[51] Int. Cl.$^5$ .............................. G06F 15/40
[52] U.S. Cl. ................... 395/600; 395/650
[58] Field of Search ... 364/200 MS File, 900 MS File; 340/146.2

[56] References Cited

PUBLICATIONS

C. Date, Addison-Wesley, An Introduction to Database Systems, vol. 1, 3rd Ed., 1982, pp. 209–210.
M. Blasgen & K. Eswaran, Storage and Access in Relational Databases, IBM Systems Journal, vol. 4, 1977, p. 363 et seq.
D. Bitton et al., Parallel Algorithms for the Execution of Relational Database Operations, ACM Trans. on Database Systems, vol. 8, No. 3, Sep. 1983, pp. 324–353.
P. Valduriez et al., Join and Semijoin Algorithms for a Multiprocessor Database Machine, ACM Trans. on Database Machines, V. 9, No. 1, Mar. 1984, pp. 133–161.
J. P. Richardson et al., Design and Evaluation of Parallel Pipelined Join Algorithms, ACM SIGMOD 1987, May 1987, pp. 160–169.
S. G. Akl et al., Optimal Parallel Merging and Sorting without Memory Conflicts, IEEE Trans. on Comp., vol. c-36, No. 11, Nov. 1987, pp. 1367–1369.
D. J. Dewitt et al., Multiprocessor Hash-based Join Algorithm, Proc. 11th VLDB, 1985.
M. S. Lakshmi et al., Effect of Skew on Join Performance in Parallel Architectures, Proc. Intl. Symposium on Databases in Parallel and Distributed Database Systems, 1988.
D. A. Schneider et al., A Performance Evaluation of Four Parallel Join Algorithms in a Shared-Nothing Multiprocessor Environment, Proc. ACM SIGMOD Conference, 1989.
R. C. Hu et al., Removing Skew Effect in Join Operation on Parallel Processors, Technical Report CSD-890027, UCLA, 1989.

*Primary Examiner*—Gareth D. Shaw
*Assistant Examiner*—Paul Kulik
*Attorney, Agent, or Firm*—Whitham & Marhoefer

[57] ABSTRACT

A technique for performing joins in parallel on a multiple processor database system effectively deals with data skew. The join operation is performed in three stages with an optional fourth stage. The first stage is a preparatory stage, the detail of which depends on the underlying join algorithm used. This preparatory stage provides pre-processing the results of which are used in the following stage as the basis for defining subtasks for the final join operation. The data provided in the first stage is used in the second stage to both define subtasks and to optimally allocate these subtasks to different processors in such a manner that the processors are close to equally loaded in the final join operation, even in the presence of data skew. This second stage is an assignment stage the details of which depend on the underlying join algorithm. Once the second stage has completed its processing of the subtasks, the subtasks are shipped to their assigned processors for processing and the final join of the two relations in the third stage. The method used in the final join operation depends on the underlying join algorithm used. Optionally, during the actual join as performed in the third stage, there could be a dynamic re-assignment of the subtasks should the join operation become unbalanced.

14 Claims, 6 Drawing Sheets

CUSTOMERS

| CUSTOMER ID | ADDRESS | ○ |
|---|---|---|
| BROOKS, B | ○ | ○ |
| BROWNE, J | ○ | ○ |
| FIELDS, K | ○ | ○ |
| ROBIN, F | ○ | ○ |
| SMITH, W | ○ | ○ |

ORDERS

| CUSTOMER ID | ITEM | QTY |
|---|---|---|
| ROBIN, F | COFFEE | ○ |
| ROBIN, F | BANANA | ○ |
| BROOKS, B | COFFEE | ○ |
| FIELDS, K | COFFEE | ○ |
| ROBIN, F | YOGURT | ○ |

SUPPLIERS

| SUPPLIER | ITEM | RATE |
|---|---|---|
| MOUNTVIEW | COFFEE | ○ |
| HILLSIDE | COFFEE | ○ |
| SUNSET | COFFEE | ○ |
| SUNSET | RAISIN | ○ |
| FARMERS | YOGURT | ○ |
| SUNSET | BANANA | ○ |
| TROPICAL | BANANA | ○ |

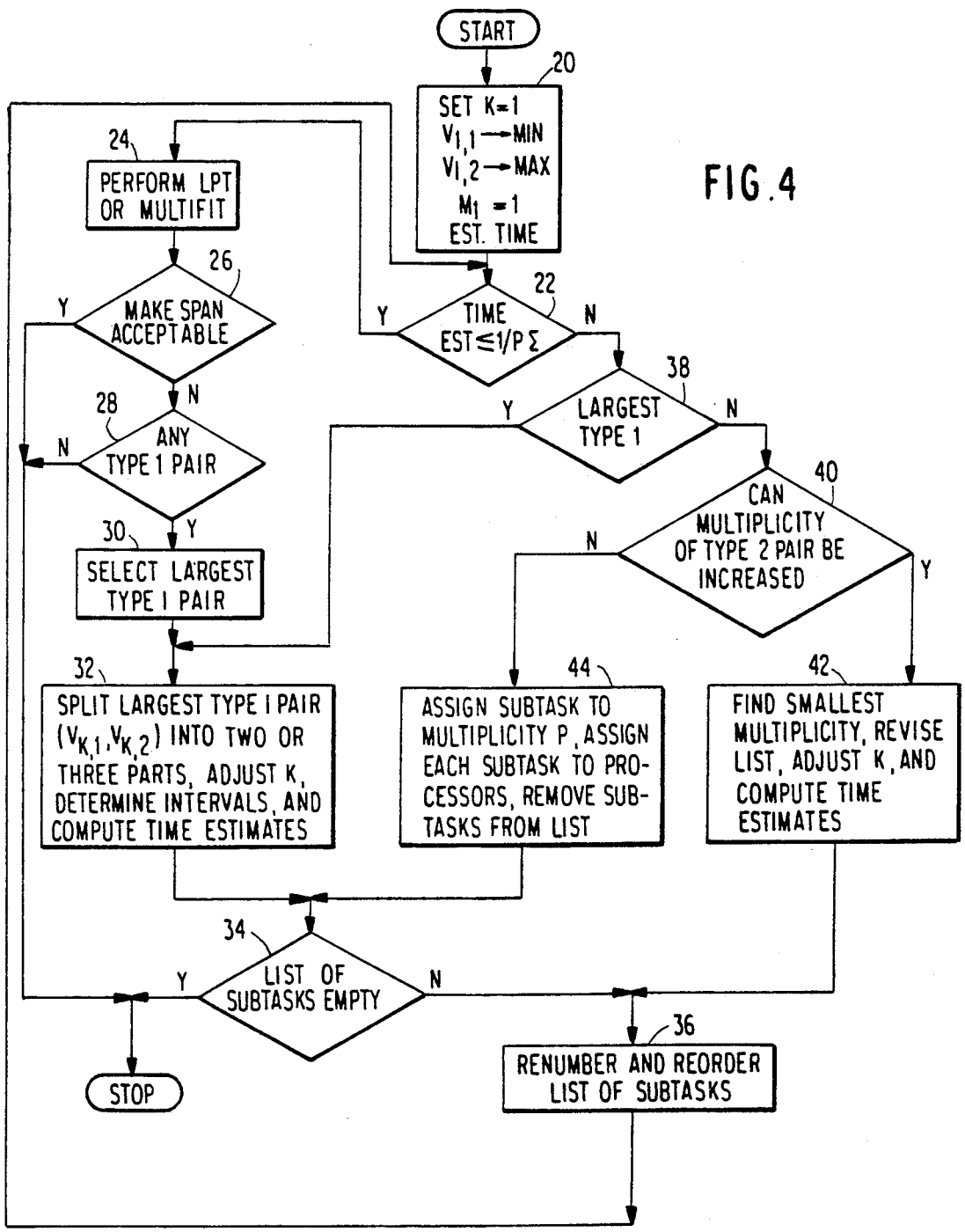

JOINING TWO DATABASE RELATIONS ON A COMMON FIELD IN A PARALLEL RELATIONAL DATABASE FIELD

BACKGROUND OF THE INVENTION

1. Field of the Invention

The present invention generally relates to managing relational databases in a multi-processor environment and, more particularly, to joining two database relations on a common field in a parallel relational database environment in the presence of data skew by partitioning the join operation into separate jobs and optimally scheduling the jobs among a plurality of processors.

2. Description of the Prior Art

A common operation in relational database systems is the natural join of two relations on respective columns defined over a common domain. See, for example, the description of the natural join at pages 209 and 210 of *An Introduction to Database Systems*, Vol. 1, 3rd Ed., by C. Date, Addison-Wesley (1982). The result of the join is a new relation in which each row is the concatenation of two rows, one from each of the original relations, such that both rows have the same value in their respective join columns.

One popular algorithm for computing the join of two relations is the sort-merge technique as described by M. Blasgen and K. Eswaran in "Storage and Access in Relational Databases", *IBM Systems Journal*, vol. 4, pp. 363 et seq. (1977). It can be summarized briefly as follows: First, each of the relations is sorted (if necessary) according to the join column. Second, the two sorted relations are scanned in the obvious interlocked sequence and merged for rows which have equal values.

When sort-merge joins are performed in parallel on a multiple processor database system, there exists a problem of data skew that might exist in the join columns of the relations. In general, the issue of skew is not addressed by the join algorithms described in the literature. An early article on parallel sort-merge join is "Parallel Algorithms for the Execution of Relational Database Operations" by D. Bitton, H. Boral, D. J. DeWitt, and W. K. Wilkinson, *ACM Trans. on Database Systems*, vol. 8, no. 3, Sep. 1983, pp. 324-353. Bitton et al. propose two external parallel sort algorithms which they call parallel binary merge and block bitonic sort. In both algorithms, sorted runs are written to disk and two-way merges are used to merge runs from disk. The merge tree is mapped to different processors with the final merge being sequential.

In "Join and Semijoin Algorithms for a Multiprocessor Database Machine", *ACM Trans. on Database Machines*, vol. 9, no. 1, Mar. 1984, pp. 133-161, P. Valduriez and G. Gardarin describe the algorithm generalized to a k-way merge. The result is p lists which are merged (assuming p<k) sequentially on a single processor.

In the paper by J. P. Richardson, H. Lu and K. Mikkilineni entitled "Design and Evaluation of Parallel Pipelined Join Algorithms", *ACM SIGMOD* 1987, San Francisco, May 1987, pp. 160-169, a method to parallelize the merge-join operation is described. In the method of Richardson et al., the relations $T_1$ and $T_2$ are merged to $m_1$ and $m_2$ runs. Assuming that $T_1$ is the larger relation, each run of $T_1$ is assigned to a processor. Each processor merges $m_2$ runs of $T_2$ (i.e., the final merge of $T_2$ is repeated, at least as many times as there are processors) and merge-joined with runs of $T_1$ assigned to that processor. This method is good when the projections of the two relations to be joined are such that one of them is very small. They also describe another version of their algorithm that is useful if one relation is small.

S. G. Akl and N. Santoro in "Optimal Parallel Merging and Sorting Without Memory Conflicts", *IEEE Trans. on Comp.*, vol. C-36, no. 11, Nov. 1987, pp. 1367-1369, consider merging two sorted lists in parallel by partitioning each of the two lists.

Another popular algorithm for computing the join of two relations is the hash join technique described by D. J. DeWitt, R. H. Gerber, G. Graefe, M. L. Heytens, K. B. Kumar, and M. Maralikrishna in "Multiprocessor Hash-based Join Algorithms", *Proc. 11th VLDB* (1985). For a multi-processor system, it can be summarized briefly as follows: First, both relations are hashed (if necessary) into hash partitions according to the join columns. The number of hash partitions generally is set equal to the number of processors. Then the hash partitions are distributed among the processors, so that the corresponding partitions of the two relations reside on the same processor. Second, the corresponding hash partitions of the two relations are joined together.

Although performance of a join query may be sped up by the use of multiple processors, the speed up from this kind of conventional join algorithm can be very limited in the presence of data skew as described by M. S. Lakshmi and P. S. Yu in "Effect of Skew on Join Performance in Parallel Architectures", *Proc. Intl. Symposium on Databases in Parallel and Distributed Database Systems* (1988). In "A Performance Evaluation of Four Parallel Join Algorithms in a Shared-Nothing Multiprocessor Environment", *Proc. ACM Sigmod Conference* (1989), D. A. Schneider and D. J. DeWitt evaluate the performance of four parallel join algorithms. They suggest that in the case of high data skew, an algorithm other than hash join should be considered. In "Removing Skew Effect in Join Operation on Parallel Processors", *Technical Report CSD*-890027, UCLA (1989), R. C. Hu and R. R. Muntz propose a simple hash join algorithm to identify the biggest skew element and assign multiple processors to handle it.

SUMMARY OF THE INVENTION

It is therefore an object of the present invention to provide efficient techniques that minimize total execution time in a parallel relational database environment for the natural join of two relations via the sort-merge and hash join techniques.

It is another object of the invention to provide sort-merge and hash join techniques for operation on a multi-processor database machine which effectively deal with any data skew that might exist in the join columns of the relations.

According to the broad teachings of the invention, the join operation is performed in three stages with an optional fourth stage. The first stage is a preparatory stage, the detail of which depends on the underlying join algorithm used. This preparatory stage provides pre-processing, the results of which are used in the following stage as the basis for defining subtasks for the final join operation. The data provided in the first stage is used in the second stage to both define subtasks and to optimally allocate these subtasks to different processors in such a manner that the processors are close to equally loaded in the final join operation, even in the presence of data skew. This second stage is an assignment stage which is crucial to the invention. The detail of the second stage is different for different underlying join algorithms; however, the general method of defining and assigning sub-tasks in the second stage is similar for the different underlying algorithms. Once the second stage has completed definition and assignment of the subtasks, data is shipped among processors according to the assignement for processing and the final join of the two relations in the third stage. The method used in the final join operation depends on the underlying join algorithm used. Optionally, during the actual join as performed in the third stage, there could be a dynamic re-assignment of the subtasks should the join operation become unbalanced.

As mentioned, the join operation can be implemented using different underlying join methods. In the first aspect of this invention, we describe a method based on sort-merge joins in parallel on a multiple processor database system. In the first stage, the first and second relations are partitioned into a number of sets corresponding to the number of processors and sorted on the column to be joined. This sorted data from the first stage is provided to the second stage. In the second stage, the sorted data from the first stage are re-partitioned into ranges and multiplicities to define subtasks each of which will join data from one range partition. The time it will take a single processor to perform each of the subtasks is estimated, and the partitions are further divided as necessary to balance sort operations among the several processors. Jobs are scheduled among the processors according to a minimum makespan optimization technique. The algorithm deals effectively with any data skew that might exist in the join columns of the relations by updating the scheduling of jobs among the processors based on estimated skew.

In the second aspect of the invention, we describe a method based on the hash join algorithm in parallel on a multiple processor database system. The technique is specifically designed to handle data skew. The proposed algorithm is based on a hierarchical hashing concept. Hierarchical hashing is combined with a minimum makespan optimization algorithm to iteratively split up the hash partitions and make equitable hash partition assignments in the multiple processors. As part of the analysis, the partitioning is refined when the size of a partition causes the load balancing to be less than desirable. During this evaluative stage, actual hashing is not performed. Instead, the benefits of hashing at each level are estimated, so that the optimal hashing can be performed later.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a high level block diagram illustrating the stages of the join operation according to the invention;

FIG. 4 is a flow chart showing the details of the second stage of the join operation using a sort-merge join algorithm according to the invention;

DETAILED DESCRIPTION OF A PREFERRED EMBODIMENT OF THE INVENTION

Figures 1, 2:
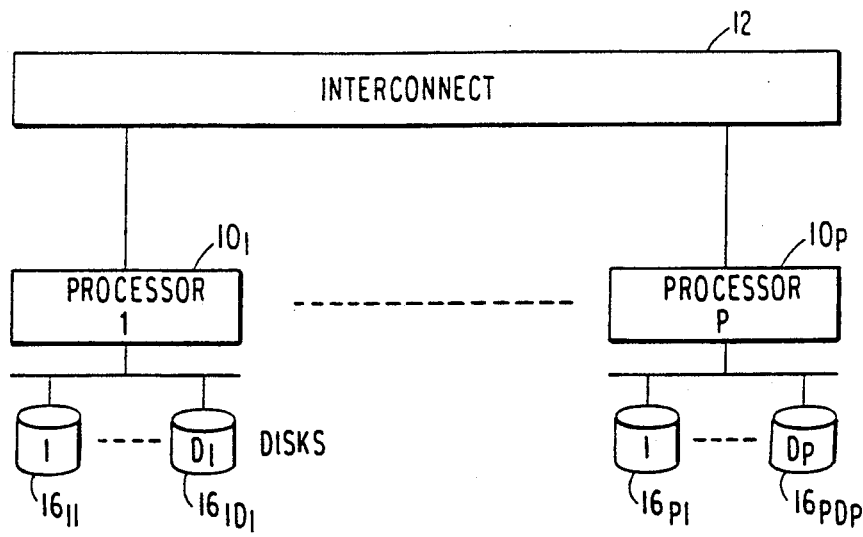
FIG. 1 is a block diagram of the general organization of a multi-processor database machine on which the join procedures according to the invention may be practiced.
FIG. 2 is an example of three relations used to illustrate the concept of data skew.

In the following description, it is assumed for the sake of simplicity that each processor in the multiple processor database machine has the same computing power. The exact nature of the parallel database architecture is otherwise largely immaterial. Referring now to the drawings, and more particularly to FIG. 1, there is shown a block diagram of the general organization of a multi-processor database machine. P processors $10_1$ to $10_P$ are linked to each other through an interconnect network 12. The processors exchange data via the interconnect network 12. The particular method used for interconnecting the various processors is not important as long as it has sufficient bandwidth for the tasks at hand. The database machine also uses conventional disk drives $16_{1D_1}$ to $16_{PD_P}$ for secondary storage. Relations to be sorted or joined are stored on these disk drives.

The distribution of values taken by the join attribute has a significant impact on the execution time of the join operation. In many databases, certain values for an attribute occur more frequently than other values, resulting in a skewed distribution. Consider the three relations shown in FIG. 2 of CUSTOMERS, ORDERS and SUPPLIERS. The Customer ID on the CUSTOMERS relation takes unique values, but the same attribute on the ORDERS relation can take non-unique values, since a customer may order more than one item. In addition, a given item can be ordered by more than one customer, and several suppliers can supply a given item.

A query which needs to list all the customers with outstanding orders would join the ORDERS and CUSTOMERS relations on the Customer ID column, resulting in a join with a single skew. A query which needs to list all the suppliers who can fill the outstanding orders would join the ORDERS and SUPPLIERS relations on the Item column, resulting in a join with a double skew. The terms single skew and double skew are used to represent the cases where the join attribute of one or both the relations have skewed distribution.

The join operation according to the invention, as illustrated in FIG. 3, has three stages and, optionally, a fourth stage. Stage 1 is the preparatory stage which is common to all aspects of the invention; however, the detail of this stage varies depending on the underlying join algorithm used. This stage is described in more detail for two underlying join algorithms. More specifically, we first describe Stage 1 for a sort-merge based embodiment of the invention, and then we describe Stage 1 for a hash based embodiment of the invention.

The Stage 1 preparatory phase provides preprocessing, and its results are used in Stage 2 as the basis for defining subtasks for the final join operation of Stage 3. More specifically, the data provided by Stage 1 is used to both define subtasks and to optimally allocate these subtasks to different processors in such a manner that the processors are close to equally loaded in the final join operation in Stage 3, even in the presence of data skew. Thus, Stage 2 is an assignment stage, and it is crucial to this invention. In the following description, we describe in detail the steps involved in Stage 2 for both the sort-merge and the two hash based embodiments of this invention.

Once Stage 2 has completed its definition and assignment of the subtasks, the partitions of the relations to be joined are shipped to their assigned processors for processing and the final join of the two relations in Stage 3. The method used in the final join operation depends on the underlying join method. Optionally, Stage 4 involves processors reporting their progress. Since the assignments in Stage 2 are based on estimates of subtask times, the join operation commenced in Stage 3 could become unbalanced. If the unbalance exceeds a certain predefined threshold, the assignment of Stage 2 can be optionally altered dynamically.

The first aspect of the invention to be described relates to an underlying join method based on the sort-merge join algorithm. Suppose that relation $R_1$ contains $N_1$ rows while relation $R_2$ contains $N_2$ rows. Let $P$ denote the number of processors in the database system.

In the first Stage of the invention, the set of rows of $R_1$ are partitioned as evenly as possible into $P$ sets of approximately $N_1/P$ rows each. In other words, the partition will have $N_1 - P\lfloor N_1/P \rfloor$ sets of $\lceil N_1/P \rceil$ rows each, and $P - N_1 + P\lfloor N_1/P \rfloor$ sets of $\lfloor N_1/P \rfloor$ rows each, where $\lceil x \rceil$ denotes the smallest integer greater than or equal to the real number $x$ and $\lfloor x \rfloor$ denotes the largest integer less than or equal to $x$. Each processor is then given one of the partitions to sort. The processors should complete their tasks in more or less equal time. The second relation is sorted analogously. At the end of this stage there are two sets of $P$ sorted "runs".

To introduce the second stage of the invention, suppose that $V_1 \leq V_2$ are two values in the domain of the join columns. Given any of the $2P$ sorted runs, for example the one corresponding to relation $i \epsilon \{1,2\}$ and processor $j \epsilon \{1, \ldots, P\}$, there is a well-defined (possibly empty) contiguous subset $\pi_{ij,V_1,V_2}$ consisting of all rows with sort column values in the interval $[V_1, V_2]$. Shipping each of the $\pi_{ij,V_1,V_2}$ over to a single processor for final sorting and merging results in an independent subtask $\tau^1_{V_1,V_2}$ of the total remaining part of the join operation. The superscript here underscores the fact that a single processor is involved. The significance of this will become apparent in the following description. Let us estimate the time it takes to perform this subtask as $T^1_{V_1,V_2} = A(I_1 + I_2) + BO$, where $$I_i = \sum_{j=1}^{P} \text{card}(\rho_{ij,V_1,V_2})$$

is the number of rows of input from $R_i$, $O$ is the number of rows of output from the merge of $R_1$ and $R_2$, and $A$ and $B$ are known constants. If we make the assumption that the values of each $\pi_{ij,V_1,V_2}$ are uniformly distributed over the $D_{V_1,V_2}$ elements in the underlying domain between $V_1$ and $V_2$, then we can compute $O = I_1 I_2 / D_{V_1,V_2}$.

In the special case where $V_1 < V_2$, the computation of $O$ is merely an estimate. We shall call a pair $(V_1, V_2)$ satisfying $V_1 < V_2$ a type 1 pair. In the special case where $V_1 = V_2$, the equation for $O$ reduces to $O = I_1 I_2$. In fact, the output is just the cross-product of the two inputs, so that the formula is precisely accurate in this case. We shall call a pair $(V_1, V_2)$ satisfying $V_1 = V_2$ a type 2 pair. Actually, for type 2 pairs, say with $V = V_1 = V_2$, we may wish to consider the additional possibility of partitioning the larger of the two sets $$\bigcup_{j=1}^{P} \rho_{1j,V_1,V_2} \text{ and } \bigcup_{j=1}^{P} \rho_{2j,V_1,V_2}$$

as evenly as possible into $M$ sets of rows each, where $1 \leq M \leq P$, and creating still finer independent subtasks $\tau^1_{V_1,V_2}, \ldots, \tau^M_{V_1,V_2}$. In subtask $\tau^m_{V_1,V_2}, m\epsilon\{1, \ldots, M\}$, the cross-product of the smaller set and the mth partition of the larger set is performed on a single processor. Assuming, for example, that the first relation contains the greater number of rows, then the time it takes to perform this subtask is $T^m_{V_1,V_2} = A(I^m_1 + I_2) + BI^m_1 I_2$, where $I^m_1$ is the number of rows in the mth partition. We do not insist that each of the $M$ subtasks be performed on a different processor, although in practice this is likely to be the case. Clearly, performing $M > 1$ subtasks is less efficient than performing one, since the input from the smaller relation (in this case $R_2$) must be shipped to each of the processors involved. We only make use of this approach to handle excessive skew. We will say that the type 2 pair $(V_1, V_2)$ has multiplicity $M$. A type 1 pair $(V_1, V_2)$ will be said to have multiplicity 1.

Now we can state our general approach: Suppose we create an ordered sequence of $K$ pairs of values with corresponding multiplicities in the domain of the join columns. This sequence will have the form $$V_{1,1} \leq V_{1,2} < \ldots$$
$$< V_{k-1,1} \leq V_{k-1,2} < V_{k,1} \leq V_{k,2} < V_{k+1,1} \leq V_{k+1,2} < \ldots < V_{K,1} \leq V_{K,2}.$$

Each value in the join columns of $R_1$ and $R_2$ is required to fall within one of the intervals $[V_{k,1}, V_{k,2}]$. For $k \epsilon \{1, \ldots, K\}$, let $M_k$ denote the multiplicity of the pair $(V_{k,1}, V_{k,2})$. We have created $$\hat{K} = \sum_{i=1}^{K} M_k$$

subtasks $\tau^m_{V_{k,1},V_{k,2}}$ to be done at the $P$ processors. The total computing time involved can be estimated as $$\sum_{k=1}^{K} \sum_{m=1}^{M_k} T^m_{V_{k,1},V_{k,2}},$$

which we wish to distribute as evenly as possible among the processors. A "perfect" assignment, not necessarily possible, would have each processor busy for $$\sum_{k=1}^{K} \sum_{m=1}^{M_k} T^m_{V_{k,1},V_{k,2}}/P$$

units of time. Specifically, we would like to assign each subtask $\tau^m_{V_{k,1},V_{k,2}}$ to a processor $A(\tau^m_{V_{k,1},V_{k,2}})$ in such a way that the completion time of the total job, $$\max_{1 \leq p \leq P} \sum_{\substack{k=1 \\ A(\tau^m_{V_{k,1},V_{k,2}}) = p}}^{K} \sum_{m=1}^{M_k} T^m_{V_{k,1},V_{k,2}},$$

is minimized. This optimization problem is the so-called minimum makespan or multiprocessor scheduling problem. Although it is known to be NP-complete, there exist a number of very fast heuristics which have reasonably good worst-case performance and excellent average-case performance. Specifically, see R. Graham, "Bounds on Multiprocessing Timing Anomalies", *SIAM Journal of Computing*, vol. 17, 1969, pp. 416 et seq., for a description of the LPT heuristic, and E. Coffman, M. Garey and D. S. Johnson, "An application of Bin Packing to Multiprocessor Scheduling", *SIAM Journal of Computing*, vol. 7, 1978, pp. 1 et seq., for a description of the MULTIFIT heuristic.

Of course, we have control over how the ordered sequence of pairs of values and corresponding multiplicities is created. The goal in the second stage of our invention is a divide-and-conquer approach to creating this ordered sequence. An example of one way to proceed is the algorithm illustrated in the flowchart of FIG. 4.

Figure 5:
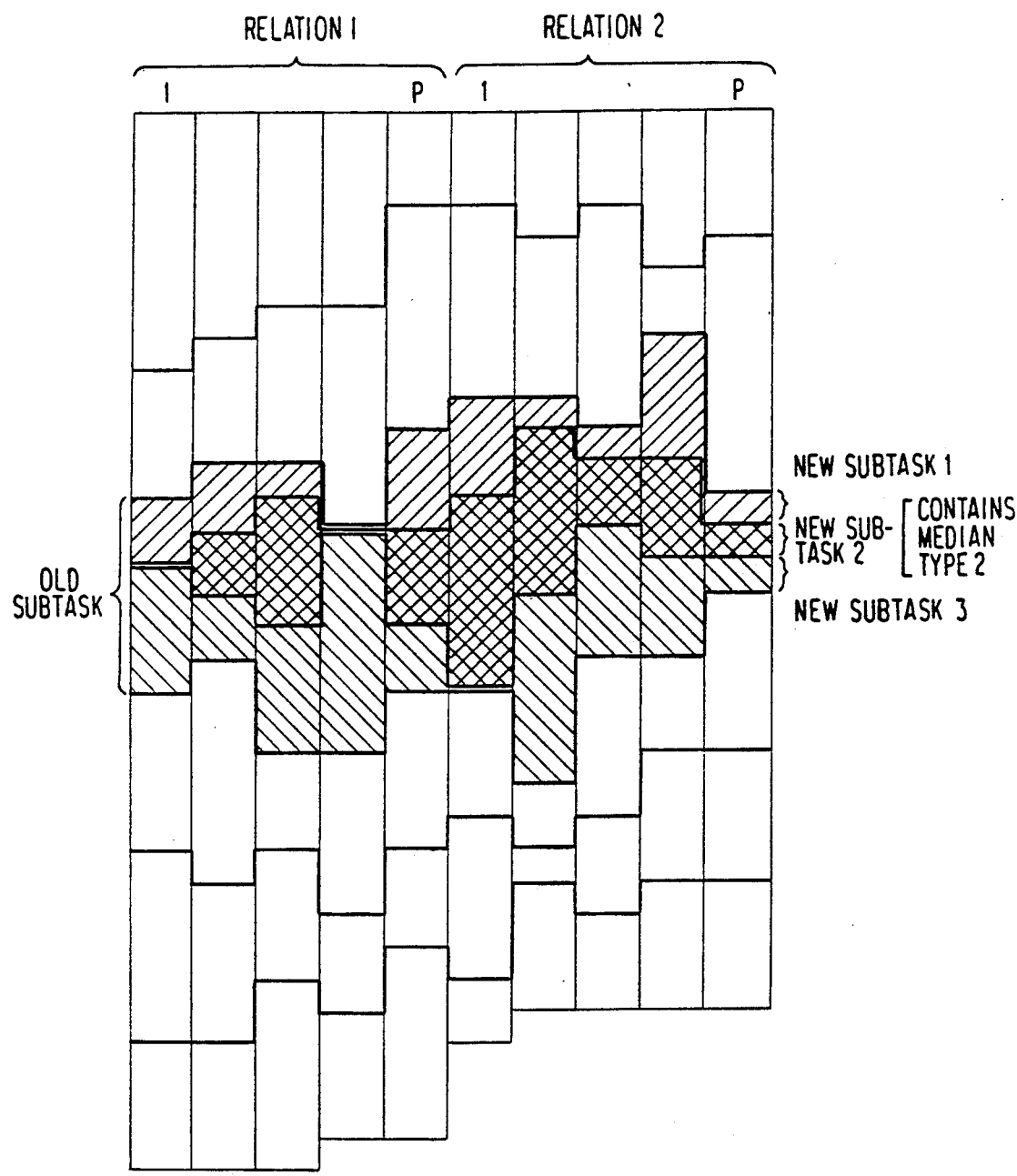
FIG. 5 is a diagram illustrating how sub-tasks are split into smaller sub-tasks in a first aspect of the invention.

With reference now to FIG. 4, the process begins in function block 20 by initially setting $K=1$, $V_{1,1}$ to be the minimum value in the join columns of $R_1$ and $R_2$, $V_{1,2}$ to be the maximum, and $M_1=1$. In addition, the time for the subtask is estimated, and a list of all current subtasks is maintained, ordered by subtask time estimates. Initially, there is only one element on the list. Next, a test is made in decision block 22 to determine if the time estimate of the largest subtask in the list is less than or equal to 1/Pth of the sum of the time estimates of all subtasks in the list. In other words, does the largest subtask "fit"? If so, the LPT or MULTIFIT algorithms are performed in function block 24. The first and most computationally costly step in either algorithm is to order the subtasks by time estimates. This is already done in our case. A test is then made in decision block 26 to determine if the makespan is within a predetermined multiplicative factor 1+ of a perfect assignment. If so, the process stops; otherwise, a test is made in decision block 28 to determine if there are any type 1 pairs. If not, the process stops; otherwise, the largest type 1 pair in the list is selected in decision block 30. Then in function block 32, the largest type 1 pair $(V_{k,1},V_{k,2})$ is split into two to three parts as follows: In $R_1$ there are $I_1$ total elements, consisting of P sorted rows $\pi_{1j,V_1,V_2}$. In $R_2$ there are $I_2$ total elements, consisting of P sorted rows $\pi_{2j,V_1,V_2}$. All told, we have 2P sorted rows with a total of $I_1+I_2$ elements. An algorithm due to Z. Galil and N. Megiddo, "A Fast Selection Algorithm and the Problem of Optimum Distribution of Effort", *Journal of the ACM*, vol. 26, 1979, pp. 58 et seq., finds the $(\lfloor I_1+I_2 \rfloor)/2$th largest element $\mu$ of this set. This is a special case of the so-called selection problem. In fact, the algorithm divides each set $\pi_{ij,V_1,V_2}$ into three contiguous (possibly empty) regions; $\pi^1_{1j,V_1,V_2}$, consisting of rows less than $\mu$, $\pi^2_{1j,V_1,V_2}$, consisting of rows equal to $\mu$, and $\pi^3_{1j,V_1,V_2}$, consisting of rows greater than $\mu$. Thus, we have created three subtasks where there had been one. The first or third subtask, but not both might be empty. Either one could be of type 1 or type 2. The second subtask will not be empty, and will be of type 2, with multiplicity 1. FIG. 5 illustrates how the three new sub-tasks are created from one old sub-task using this method. Next, K is adjusted, the intervals are determined, and the time estimates are computed for each of the new subtasks. If the number of rows of output is computed to be zero for any of the subtasks, the subtask can be deleted from the list; the part corresponding to one of two relations is empty, and the join will yield nothing.

At this point, a test is made in decision block 34 to determine if the list of subtasks empty. If so, the process stops; otherwise, the list of subtasks is renumbered and reordered in function block 36. Control then loops back to decision block 22.

If the test in decision block 22 is negative, then a further test is made in decision block 38 to determine if the largest element in the list of subtasks is of type 1. If so, control goes to function block 32; otherwise, a test is made in decision block 40 to determine if it is possible to increase the multiplicity of type 2 pair corresponding to the largest subtask in the list to a new multiplicity $M<P$ in such a way that each subtask now fits? If so, the smallest such multiplicity is found and the list of subtasks is revised in function block 42 to incorporate this new multiplicity. Additionally, K is adjusted and the time estimates for the new subtasks are computed before control goes to function block 36.

If the test in decision block 40 is negative, then in function block 44 the subtask is assigned to have multiplicity P, each of the P subtasks is assigned to distinct processors, and the subtasks are removed from the list. In addition, K is adjusted. The P subtasks removed will complete in more or less equal time. Control now goes to decision block 34.

Our approach favors multiplicity 1 pairs, but allows for higher multiplicities to overcome excessive skew. The locations of these excessive skews should naturally present themselves during the execution of the algorithm. The subtask time estimates should similarly become more and more accurate as the algorithm executes. There are many variations on the above theme which could also be implemented. For example, LPT or MULTIFIT need not be performed every time through function block 24. A counter could regulate the number of executions of the minimum makespan algorithm. Similarly, the algorithm could time out according to another counter, even if the solution is not fully satisfactory.

In Stage 3 shown in FIG. 3, the sorted tuples of relations $R_1$ and $R_2$ are read from disk, and the tuples corresponding to the subtasks are shipped to the assigned processor. The subtasks are then executed on the assigned processors to perform the final join operation.

Optionally, as indicated by Stage 4 in FIG. 3, during the course of the actual join, the processors could report their progress. Since the subtask time estimates are just that, the progress of the join could be come unbalanced. If the unbalance exceeds a certain predefined threshold, a new LPT or MULTIFIT algorithm could be initiated.

The invention can also be practiced using a method based on the hash-join algorithm and using a double hashing technique implementing a hierarchical hashing in Stages 1 and 2 of FIG. 3. Other variations of the hierarchical hashing technique are discussed later. The double hashing is adopted to help identify the skew values, provide better estimates of the join costs at each processor, and ultimately make the load balancing more even.

In the first stage of FIG. 3, we start with each processor having close to equal partitions of $R_1$ of size approximately $N_1/P$ rows each. In other words, the partition will have $N_1 - P\lfloor N_1/P \rfloor$ sets of $\lceil N_1/P \rceil$ rows each, and $P - N_1 + P\lfloor N_1/P \rfloor$ sets of $\lfloor N_1/P \rfloor$ rows each. Let $H_1$ and $H_2$ be two hash functions, where $H_2$ is used to further divide each hash partition created by $H_1$ into finer partitions. Assume $H_1$ can hash the rows into $B_1$ hash partitions and $H_2$ can refine each of these partitions into $B_2$ finer hash partitions. For each processor j, let $d^j_{k,m}(R_1)$ be the number of rows whose hash value of its join column under $H_1$ falls into the kth hash partition of $H_1$ and whose hash value under $H_2$ falls into the mth hash partition of $H_2$. We refer to the row as having a composite hash value (k,m). Each processor reads in tuples of $R_1$ from disk and maintains counts $d^j_{k,m}(R_1)$ for $k = 1, \ldots, B_1$ and $m = 1, \ldots, B_2$ in the main memory of each processor j to keep track of how many tuples will be hashed into the fine-grained partitions based on $H_1$ and $H_2$. The processors should complete their tasks in more or less equal time. The second relation is hashed analogously, yielding $d^j_{k,m}(R_2)$. At the end of this stage, we have two sets of counts, $d^j_{k,m}(R_i), i=1,2$.

At the start of the second stage of FIG. 3, the $d^j_{k,m}(R_i)$ are added across the processors to obtain $$\beta_{k,m}(R_i) = \sum_{1 \leq j \leq P} \alpha^j_{k,m}(R_i)$$

Given any of the $2PB_1$ hash partitions from $H_1$, for example the one corresponding to relation $i \in \{1,2\}$, processor $j \in \{1, \ldots, P\}$, and hash partition $k \in \{1, \ldots, B_1\}$, and given a subset $E \subseteq \{1, \ldots, B_2\}$, there is a well-defined (possibly empty) subset $\pi_{ij,k,E}$ consisting of all rows with composite hash values (k,m), m$\in$E. Shipping each of the $\pi_{ij,k,E}$ over to a single processor for final join results in an independent subtask $\tau^1_{k,E}$ of the total remaining part of the join operation. The superscript here underscores the fact that a single processor is involved. The significance of this will become apparent shortly. The time it takes to perform this subtask is estimated as $T^1_{k,E} = A(I_1 + I_2) + BO$, where $$I_i = \sum_{m \in E} \beta_{k,m}(R_i)$$

is the number of rows of input from $R_i$, O is the number of rows of output from the merge of $R_1$ and $R_2$, and A and B are known constants. If it is assumed that the values of each $\pi_{ij,k,m}$, m$\in$E, are uniformly distributed over the $D_{k,m}$ elements in the underlying domain with composite hash value (k,m), then we can compute $$O = \sum_{m \in E} \beta_{k,m}(R_1)\beta_{k,m}(R_2)/D_{k,m}.$$

For the case E contains a single value, say m, we may wish to consider the additional possibility of partitioning the larger of the two sets $$\bigcup_{j=1}^{P} \rho_{1,j,k,\{m\}} \text{ and } \bigcup_{j=1}^{P} \rho_{2,j,k,\{m\}}$$

as evenly as possible into M sets of rows each, where $1 \leq M \leq P$, and creating still finer independent subtasks $\tau^1_{k,\{m\}}, \ldots, \tau^M_{k,\{m\}}$. In subtask $\tau^j_{k,\{m\}}, j \in \{1, \ldots, M\}$, the join of the smaller set and the jth sub-partition of the larger set is performed on a single processor. Assuming, for example, that the first relation contains the greater number of rows, then the time it takes to perform this subtask is $T^j_{k,\{m\}} = A((I_1/M) + I_2) + BI_1I_2/M$. We do not insist that each of the M subtasks be performed on a different processor, although in practice this is likely to be the case. Clearly, performing $M > 1$ subtasks is less efficient than performing one, since the input from the smaller relation (in this case $R_2$) must be shipped to each of the processors involved. We only make use of this approach to handle excessive skew. We will say that the composite hash partition (k, {m}) has multiplicity M. Otherwise it will be said to have multiplicity 1.

Now we can state our general approach: Suppose we create an ordered sequence of K pairs of the form $(V_{k,1}, V_{k,2})$ where $V_{k,1} \in \{1, \ldots, B_1\}$ and $V_{k,2} \subseteq \{1, \ldots, B_2\}$. In the case where $V_{k,2}$ contains just a single element, the $(V_{k,1}, V_{k,2})$ pair is referred to as a type 2 pair. Otherwise, it is referred to as a type 1 pair. The sequence of K pairs is required to partition the set of composite hash classes in the sense that for each composite hash class (i,j), there must exist a unique $K \in \{1, \ldots, K\}$ such that $i = V_{k,1}$ and $j \in V_{k,2}$. For $k \in \{1, \ldots, K\}$, let $M_k$ denote the multiplicity of the pair $(V_{k,1}, V_{k,2})$. We have created subtasks $\tau^m_{V_{k,1}, V_{k,2}}$ to be done at the P processors. The total computing time involved can be estimated as $$\sum_{k=1}^{K} \sum_{m=1}^{M_k} T^m_{V_{k,1}, V_{k,2}}$$

which we wish to distribute as evenly as possible among the processors. A "perfect" assignment, not necessarily possible, would have each processor busy for $$\sum_{k=1}^{K} \sum_{m=1}^{M_k} T^m_{V_{k,1}, V_{k,2}}/P$$

units of time. Specifically, we would like to assign each subtask $\tau^m_{V_{k,1}, V_{k,2}}$ to a processor $A(\tau^m_{V_{k,1}, V_{k,2}})$ in such a way that the completion time of the total job, $$\max_{1 \leq p \leq P} \sum_{k=1}^{K} \sum_{\substack{m=1 \\ A(\tau^m_{V_{k,1}, V_{k,2}}) = p}}^{M_k} T^m_{V_{k,1}, V_{k,2}}$$

is minimized. This optimization problem is the so-called minimum makespan or multiprocessor scheduling problem. Although it is known to be NP-complete, there exist a number of very fast heuristics which have reasonably good worst-case performance and excellent average-case performance.

The point is that we can exercise control over how the ordered sequence of pairs of values and corresponding multiplicities is created. The goal in the second stage of our invention is a divide-and-conquer approach to creating this ordered sequence. We present two alternative examples of possible ways to proceed in Stage 2.

Figure 6:
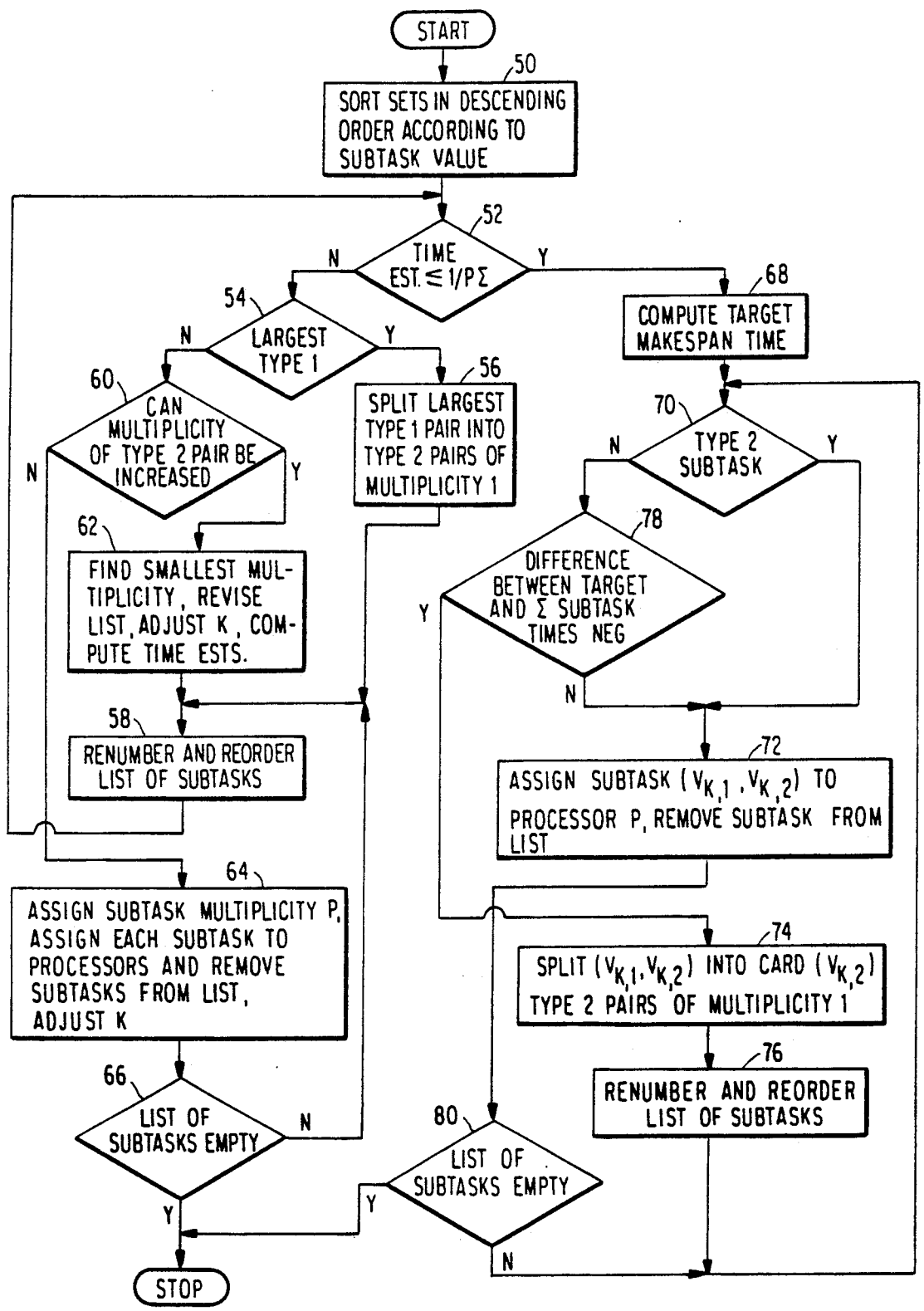
FIG. 6 is a flow chart showing the details of the second stage of the join operation using a first hash join algorithm according to the invention.

The first method uses a variant of the LPT heuristic by Graham and is illustrated in the flowchart of FIG. 6. Referring now to FIG. 6, initially, in function block 50, the sets $\{(k,F), k = 1, \ldots, B_1\}$, where $F = \{1, \ldots, B_2\}$, are sorted in descending order according to the subtask value, $T^1_{k,F}$. A list of all current subtasks is maintained, ordered by subtask time estimates. A test is then made in decision block 52 to determine if the time estimate of the largest subtask in the list is less than or equal to 1/Pth of the sum of the time estimates of all subtasks in the list. In other words, does the largest subtask "fit"? If not, a test is made in decision block 54 to determine if the largest element in the list of subtasks of type 1. If so, then in function block 56 the largest type 1 pair $(V_{k,1},V_{k,2})$ is split into card $(V_{k,2})$ type 2 pairs, each of multiplicity 1. Next, the list of subtasks are renumbered and the list of subtasks is reordered in function block 58 before control loops back to decision block 52.

If the test in decision block 54 is negative, a further test is made in decision block 60 to determine if it possible to increase the multiplicity of the type 2 pair corresponding to the largest subtask in the list to a new multiplicity $M<P$ in such a way that each subtask now fits. If so, the smallest such multiplicity is found in function block 62, and the list of subtasks is revised to incorporate this new multiplicity. Additionally, K is adjusted and the time estimates are computed for the new subtasks. The process then goes to function block 58.

If the test in decision block 60 is negative, then in function block 64 the subtask is assigned to have multiplicity P, each of the P subtasks is assigned to distinct processors, and the subtasks are removed from the list. K is also adjusted. The P subtasks removed will complete in more or less equal time. A test is next made in decision block 66 to determine if the list of subtasks empty. If so, the process stops; otherwise, the process loops back to function block 58.

When the test in decision block 52 is positive, all subtasks fit. In function block 68, the target makespan time TARGET is computed as 1/Pth of the sum of the time estimates of all subtasks in the list. The key point is that this target is now stable. Although we may split type 1pairs into type 2 pairs in subsequent steps, the sum of the time estimates will remain unchanged. Our LPT variant takes place in the following steps.

Consider the processor p for which the difference between TARGET and the sum of the subtask times already assigned to it is maximal. Consider the largest subtask $(V_{k,1},V_{k,2})$ remaining on the list. A test is made in block 70 to determine if it is a type 2 subtask. If so in function block 72, subtask $(V_{k,1},V_{k,2})$ is assigned to processor p, and the subtask is removed from the list. Then, in decision block 80, a test is made to determine if the list of subtasks is empty. If so, the process ends; otherwise, the process loops back to decision block 70.

If the decision in decision block 70 is negative, a test is made in decision block 78 to determine whether if $(V_{k,1},V_{k,2})$ were assigned to processor p, would the revised difference between TARGET and the sum of the subtask times assigned to it be negative. If not, control goes to function block 72; otherwise, in function block 74, $(V_{k,1},V_{k,2})$ is split into card $(V_{k,2})$ type 2 pairs, each of multiplicity 1. The list of subtasks is renumbered and reordered in function block 76 before control returns to decision block 70.

Figure 7:
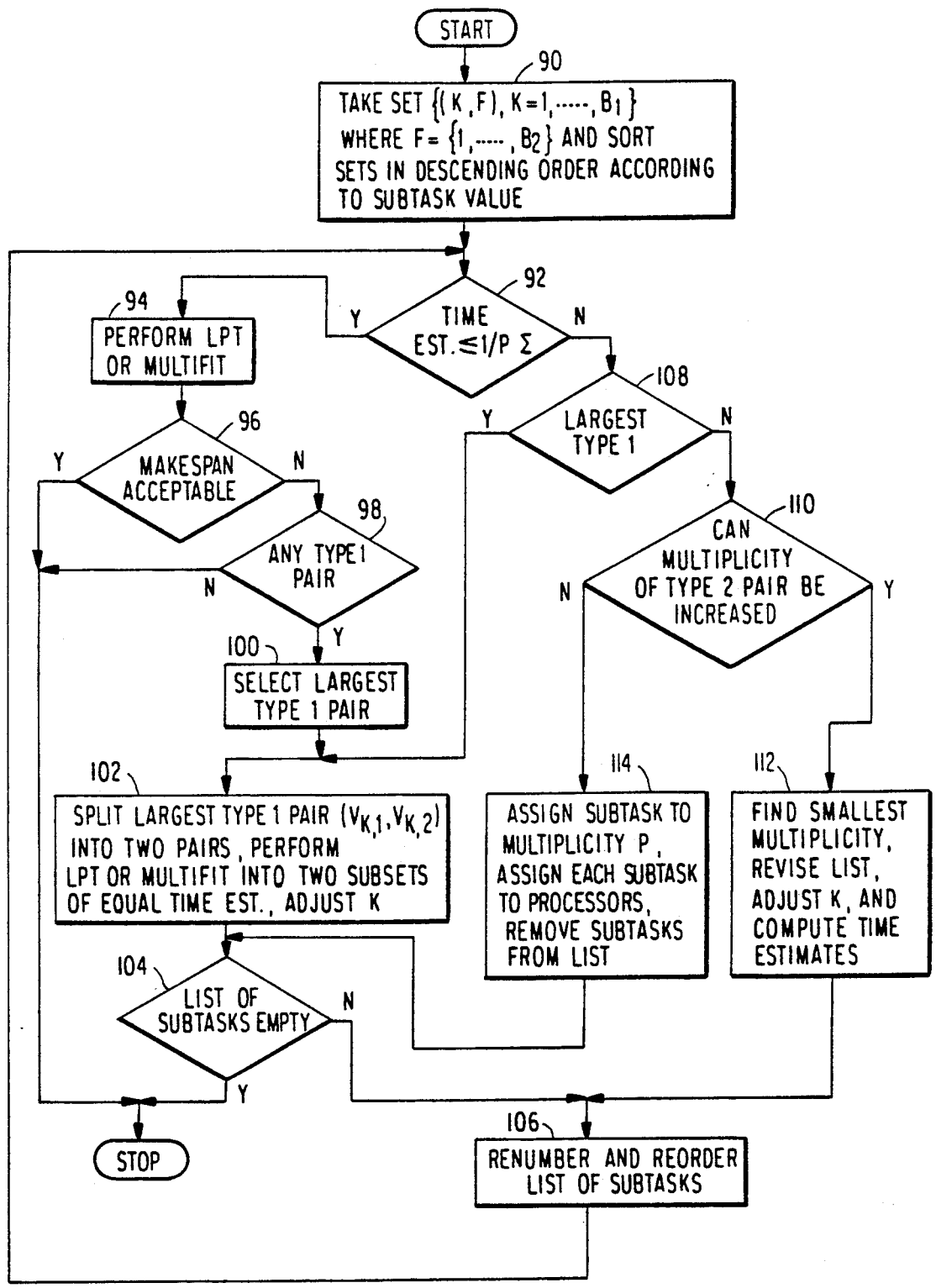
FIG. 7 is a flow chart showing the details of the second stage of the join operation using a second hash join algorithm according to the invention.

The second hash join algorithm for Stage 2 of the join operation is illustrated by the flowchart in FIG. 7. As may be observed by comparing the flowcharts of FIGS. 4 and 7, the overall logic is quite similar between the sort-merge join algorithm and this hash join algorithm. With reference now to FIG. 7, the process begins in function block 90 by initially taking the set $\{(k,F), k=1, \ldots, B_1\}$, where $F=\{1, \ldots, B_2\}$, and sort them in descending order according to the subtask value, $T^1_{k,F}$. We will maintain a list of all current subtasks, ordered by subtask time estimates. A test is then made in decision block 92 to determine if the time estimate of the largest subtask in the list is less than or equal to 1/Pth of the sum of the time estimates of all subtasks in the list. In other words, does the largest subtask "fit"? If so, LPT or MULTIFIT is performed in function block 94. Again, the first and most computationally costly step in either algorithm is to order the subtasks by time estimates. This is already done in our case. A test is next made in decision block 96 to determine if the makespan within a predetermined multiplicative factor $1+\Delta$ of a perfect assignment. If so, the process stops; otherwise, a test is made in decision block 98 to determine if any type 1 pair remains. If not, the process stops; otherwise, the largest type 1 pair in the list is selected in function block 100. Next, in function block 102, the largest type 1 pair $(V_{k,1},V_{k,2})$ is split into two pairs, as follows: For each element $m \epsilon V_{k,2}$, there is a corresponding subtask time $T^1_{V_{k,1},\{m\}}$. Perform LPT or MULTIFIT on the set $\{\tau_{V_{k,1},\{m\}} | m \epsilon V_{k,2}\}$, splitting $V_{k,2}$ into two subsets $V^1_{k,2}$ and $V^2_{k,2}$ of approximately equal total subtask time estimates. If any of the new subtasks is estimated to be of time 0, it can be deleted from the list. In addition, K is adjusted. Alternatively, one could split the largest type 1 pair into any number Q of groupings between 2 and the cardinality of $V_{k,2}$. The choice $Q=2$ is chosen for exposition. A test is now made in decision block 104 to determine if the list of subtasks empty. If so, the process stops; otherwise, the list of subtasks is renumbered and reordered in function block 106 before control loops back to decision block 92.

If the test in decision block 92 is negative, a test is made in decision block 108 to determine if the largest element in the list of subtasks is of type 1? If so, control goes to function block 102; otherwise, a test is made in decision block 110 to determine if it is possible to increase the multiplicity of the type 2 pair corresponding to the largest subtask in the list to a new multiplicity $M<P$ in such a way that each subtask now fits. If so, the smallest such multiplicity is found and the list of subtasks is revised to incorporate this new multiplicity in function block 112. K is adjusted, and the time estimates are computed for the new subtasks. Control then goes to function block 106. If the test in decision block 110 is negative, then in function block 114, the subtask is assigned to have multiplicity P, each of the P subtasks is assigned to distinct processors, and the subtasks are removed from the list. In addition, K is adjusted. The P subtasks removed will complete in more or less equal time. The process then goes to function block 104.

Figures 8A, 8B:
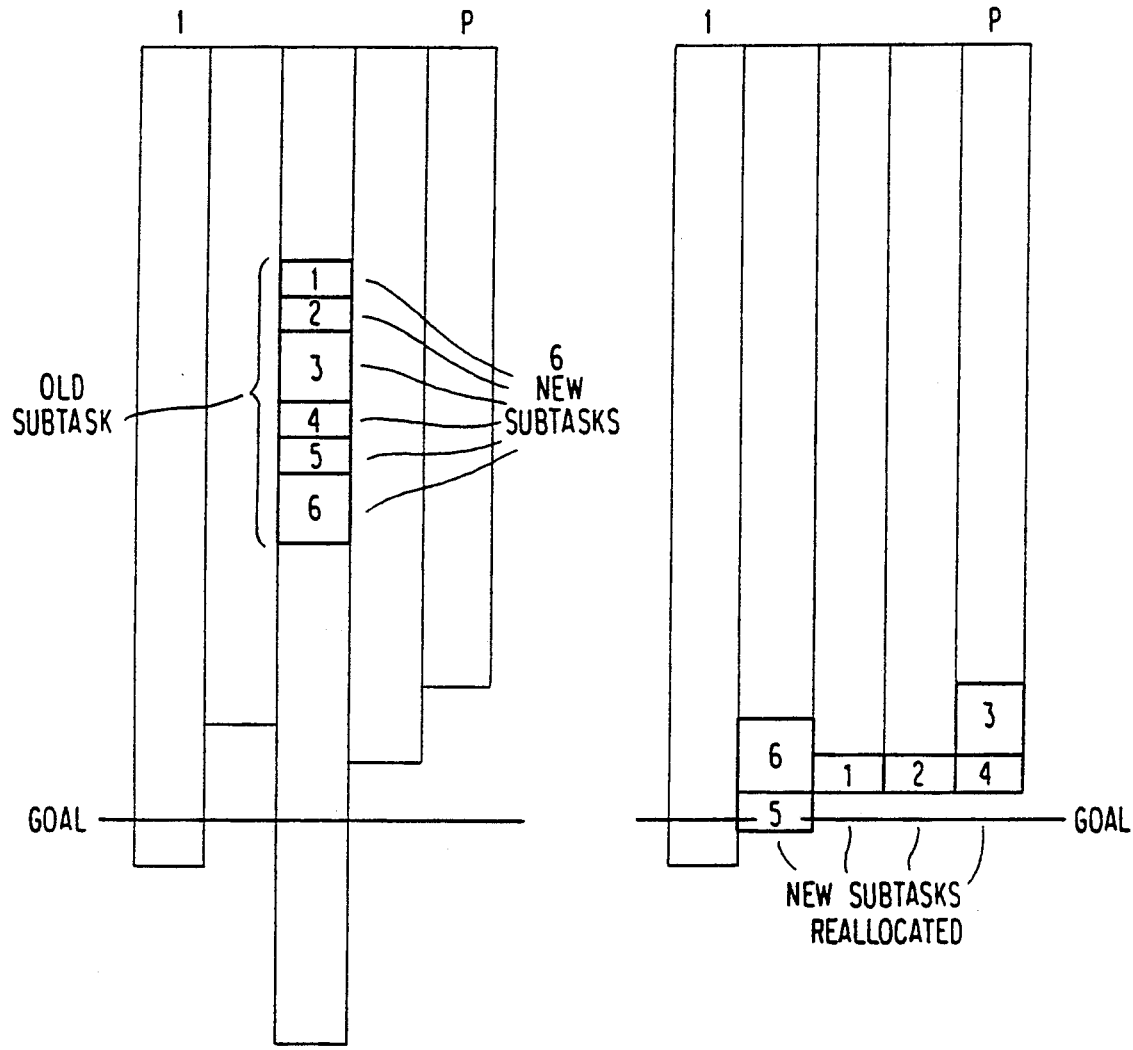
FIGS. 8A–8B are diagrams illustrating how sub-tasks are re-allocated in the hash join operation of the invention.

Our approach favors multiplicity 1 pairs but allows for higher multiplicities to overcome excessive skew. The locations of these excessive skews should naturally present themselves during the execution of the algorithm. There are many variations on the above methods which could also be implemented. For example, in either method an iterative improvement algorithm could be applied at the end. This method is illustrated in FIGS. 8A-8B. In this figure, the GOAL represents 1/Pth of the sum of the time estimates of all subtasks. The method picks the processor P with the largest sum of the time estimates of subtasks assigned to it. At processor P, the largest type 1 subtask $(V_{k,1},V_{k,2})$ is picked and is split into card $(V_{k,2})$ type 2 each of multiplicity 1. These tasks are then re-assigned to the processors, the largest subtask first, as illustrated in FIGS. 8A-8B.

As in Stage 2 for the sort-merge join algorithm illustrated in FIG. 4, in this method for Stage 2 based on the second hash join algorithm as illustrated in FIG. 7, LPT or MULTIFIT need not be performed every time through function block 94. A counter could regulate the number of executions of the minimum makespan algorithm. Similarly, the algorithm could time out according to another counter, even if the solution is not fully satisfactory.

In Stage 3 shown in FIG. 3, the tuples of relations $R_1$ and $R_2$ are read from disk, the hash functions $H_1$ and $H_2$ are applied, and the tuples shipped to the assigned processors as determined in Stage 2.

Optionally in Stage 4 shown in FIG. 3, during the course of the actual join, the processors could report their progress. Since the subtask time estimates are just that, the progress of the join could become unbalanced. If the unbalance exceeds a certain predefined threshold, a new LPT or MULTIFIT algorithm could be initiated.

We note that there are many alternative ways to implement the hierarchical hashing concept. One alternative is to keep a most-frequently-used list on the different join column values encountered during Stage 1 when the hashing is performed. The occurrence frequency would also be maintained. If the occurrence rate of a join column value drops below a predefined threshold, it would be removed from the list. Another alternative is to do sampling of join column values during Stage 1 when the hashing is performed. The most-frequently-used list or sampling results could then be used to identify the skew distribution and guide which partitions are to be further partitioned.

In summary, we have provided a method of joining two database relations on a common field in a parallel relational database environment having a plurality of processors based on using either sort-merge or hash join algorithms. The process involves partitioning a first relation into a multiplicity of partitions and a second relation into a corresponding multiplicity of partitions such that each individual value in the common field corresponds uniquely to the corresponding one of the partitions of the second relation, thereby defining a current set of jobs, each consisting of the task of joining a partition of the first relation with the corresponding partition of the second relation. The time it will take for a single processor to accomplish each of the jobs is estimated, these estimates forming a current set of execution time estimates.

Next, it is necessary to reduce the jobs to a time less than or equal to the sum of the time estimates divided by the number of processors. This is done by subpartitioning any partitions which correspond to jobs having an execution time estimate which is greater than the sum of the time estimates divided by the number of processors. The subpartitioning is accomplished by replacing any such partition of the first relation and the corresponding partition of the second relation which include more than one distinct value in the common field with at least two smaller partitions, each individual value in the common field corresponding uniquely to one of the smaller partitions of the first relation and uniquely to the corresponding one of the smaller partitions of the second relation. This defines replacement jobs in the current set of jobs where each replacement job consists of the task of joining one of such smaller partitions of the first relation with the corresponding smaller partition of the second relation. With respect to any such job where the corresponding partitions of the first and second relations include only one distinct value in the common field, the larger of such corresponding partitions is replaced with a plurality of smaller partitions, the number of such smaller partitions being the minimum integer which when divided into the execution time estimate for such job results in a time less than the sum of the execution time estimates divided by the number of processors. Thus, replacement jobs are defined where each replacement job consists of the task of joining on of the smaller partitions of the one relation with the unchanged corresponding partition of the other relation.

Once the process of subpartitioning has been completed, the current set of execution time estimates are updated by replacing the execution time estimates of the replaced jobs with execution time estimates for the replacement jobs. The process is iteratively performed until there is no execution time estimate for any job in the current set of jobs which is greater than the sum of the execution time estimates divided by the number of processors.

An important part of the invention involves the refinement of the processor assignments. This is done by scheduling the current set of jobs among the processors using a minimum makespan optimization technique. The amount of completion time skew which would result if the processors were to perform the current set of jobs as scheduling is estimated. This estimate is compared with a skew standard, and if the estimate is acceptable, then the current set of jobs as scheduled is executed on the processors, thereby joining the two database relations on a common field with minimum completion time skew.

If the estimated skew does not meet the skew standard, then one of the largest partitions of the first and second relations is replaced with at least two smaller partitions to define replacement jobs for the job defined by the replaced partitions. Each replacement job consists of the task of joining one of the smaller replacing partitions of the first relation with the corresponding smaller replacing partition of the second relation. The current set of execution time estimates is then updated by replacing the execution time estimates of the replaced jobs with execution time estimates for the replacement jobs. In addition, the scheduling of the current set of jobs is updated so as to minimize the estimated completion time skew. The amount of completion time skew is estimated and compared with the skew standard. This process is iteratively repeated until either the amount of skew meets the skew standard or all partitions have been subpartitioned to a predetermined maximum extent.

While the invention has been described in terms of preferred embodiments based on sort-merge and hash join algorithms, those skilled in the art will recognize that the invention can be practiced with modifications within the spirit and scope of the appended claims.

Having thus described our invention, what we claim as new and desire to secure by Letters Patent is as follows:

1. In a multi-processor database machine having P parallel processors linked via an interconnect network, said P processors having storage means for storing database relations to be joined, a method performed by said database machine of joining first and second database relations stored on said storage means on a common field, said method comprising the steps of:
   (a) partitioning the first relation into a multiplicity of partitions and the second relation into a corresponding multiplicity of partitions such that each individual value in the common field corresponds uniquely to one of the partitions of the first relation and uniquely to the corresponding one of the partitions of the second relation to define a current set of jobs, each consisting of a task of joining a partition of the first relation with a corresponding partition of the second relation;

(b) scheduling a current set of jobs among said P processors using a minimum makespan optimization technique that schedules said jobs such that a maximum running time on any processor is minimized;

(c) estimating the amount of completion time skew which would result if P processors were to perform the current set of jobs as scheduled in step (b);

(d) comparing the estimated amount of skew with a skew standard; and (e) if the estimated skew meets the skew standard, executing the current set of jobs as last scheduled using P processors, thereby joining said two database relations on a common field with minimum completion time skew.

2. The method recited in claim 1 wherein said partitioning step results in larger and smaller partitions of the first and second relations and if the estimated skew does not meet the skew standard, further comprising the steps of:

(f) replacing one of the larger partitions of the first and second relations with at least two smaller partitions, thereby defining replacement jobs for the job defined by the replaced partitions, each such replacement job consisting of a task of joining one of the smaller replacing partitions of the first relation with the corresponding smaller replacing partition of the second relation;

(g) updating a current set of execution time estimates by replacing the execution time estimates of the replaced jobs with execution time estimates for the replacement jobs;

(h) updating the scheduling of the current set of jobs among P processors so as to minimize the estimated completion time skew;

(i) estimating the amount of completion time skew which would result if P processors were to perform the current set of jobs as scheduled in step (h);

(j) comparing the amount of completion time skew estimated in step (i) with the skew standard; and (k) iteratively performing steps (e) through (j) until either the amount of skew meets the skew standard in step (j) or all partitions have been subpartitioned to a predetermined maximum extent.

3. The method recited in claim 2 wherein the step of partitioning further comprises the steps of:

(l) estimating the time it will take for a single processor to accomplish each of said jobs, said estimates forming a current set of execution time estimates;

(m) subpartitioning any partitions which correspond to jobs having an execution time estimate which is greater than the sum of the execution time estimates divided by P;

(n) updating the current set of execution time estimates by replacing the execution time estimates of the replaced jobs with execution time estimates for the replacement jobs; and (o) iteratively performing the steps (m) and (n) until there is no execution time estimate for any job in the current set of jobs which is greater than the sum of the execution time estimates divided by P.

4. The method recited in claim 3 wherein the step of subpartitioning further comprises the steps of:

(p) replacing any such partition of the first relation and corresponding partition of the second relation which include more than one distinct value in the common field with at least two smaller partitions, each individual value in the common field corresponding uniquely to one of the smaller partitions of the first relation and uniquely to the corresponding one of the smaller partitions of the second relation, thereby defining replacement jobs for any step (p) jobs in the current set of jobs, each such replacement job consisting of the task of joining one of such smaller partitions of the first relation with the corresponding smaller partition of the second relation; and (q) with respect to any such job where the corresponding partitions of the first and second relations include only one distinct value in the common field, replacing the larger of such corresponding partitions with X smaller partitions, where X is the minimum integer which when divided into the execution time estimate for such job results in a time less than the sum of the execution time estimates divided by P, thereby defining replacement jobs for any such step (q) jobs in the current set of jobs, each such replacement job consisting of the task of joining one of the X smaller partitions of the one relation with the unchanged corresponding partition of the other relation.

5. The method recited in claim 2 wherein $V_1$ and $V_2$ are two values in a domain of join columns of said first and second relations and a pair $(V_1,V_2)$ satisfying $V_1 < V_2$ is defined as a type 1 pair and a pair $(V_1,V_2)$ satisfying $V_1 = V_2$ is defined as a type 2 pair, and if the estimated skew does not meet the skew standard, further comprising prior to step (f) the steps of:

(r) selecting the largest type 1 pair for replacing with at least two smaller partitions; but (s) if there are no type 1 pairs, then executing the current set of jobs as last scheduled using P processors, thereby joining said two database relations on a common field with minimum completion time skew.

6. The method recited in claim 3 wherein $V_1$ and $V_2$ are two values in a domain of join columns of said first and second relations and a pair $(V_1,V_2)$ satisfying $V_1 < V_2$ is defined as a type 1 pair and a pair $(V_1,V_2)$ satisfying $V_1 = V_2$ is defined as a type 2 pair, and wherein when a time estimate for one of said jobs is greater than 1/P of a total execution time in step (m) further comprising the steps of:

(t) determining if said one job is a type 1 pair; and (u) if a type 1 pair, then replacing it with at least two partitions, one of which is of type 2.

7. The method recited in claim 6 wherein if said one job is a type 2 pair, then performing the following steps:

(v) determining if the multiplicity of the type 2 pair can be increased; and (w) if the multiplicity can be increased, finding the smallest multiplicity and revising the current set of jobs.

8. The method recited in claim 7 wherein if the multiplicity of the type 2 pair cannot be increased, then performing the steps of:

(x) assigning the type 2 pair to have a multiplicity P; and (y) assigning each of the P jobs to distinct processors.

9. The method recited in claim 1 wherein step (a) is performed by a hierarchical double hashing technique using two hash functions $H_1$ and $H_2$ where $H_2$ is used to further divide each hash partition created by $H_1$ into finer partitions.

10. The method recited in claim 1 wherein during step (e) monitoring the progress of said processors in the join operation, and if the progress of the join operation becomes unbalanced exceeding a predetermine threshold, repeating steps (b) to (d).

11. A method of joining first and second database relations on a common field in a parallel relational database environment having P processors comprising a database machine, comprising the database machine performed steps of:

(a) partitioning the first relation into a multiplicity of partitions and the second relation into a corresponding multiplicity of partitions such that each individual value in the common field corresponds uniquely to one of the partitions of the first relation and uniquely to the corresponding one of the partitions of the second relation to define a current set of jobs, each consisting of the task of joining a partition of the first relation with the corresponding partition of the second relation;

(b) estimating the time it will take for a single processor to accomplish each of said jobs, said estimates forming a current set of execution time estimates;

(c) subpartitioning any partitions which correspond to jobs having an execution time estimate which is greater than the sum of the execution time estimates divided by P, by:

(1) replacing any such partition of the first relation and corresponding partition of the second relation which include more than one distinct value in the common field with at least two smaller partitions, each individual value in the common field corresponding uniquely to one of the smaller partitions of the first relation and uniquely to the corresponding one of the smaller partitions of the second relation to define replacement jobs for any step (c)(1) jobs in the current set of jobs, each such replacement job consisting of the task of joining one of such smaller partitions of the first relation with the corresponding smaller partition of the second relation; and (2) with respect to any such job where the corresponding partitions of the first and second relations include only one distinct value in the common field, replacing the larger of such corresponding partitions with X smaller partitions, where X is the minimum integer which results in a time less than the sum of the execution time estimates divided by P, thereby defining replacement jobs for any such step (c)(2) jobs in the current set of jobs, each such replacement job consisting of the task of joining one of the X smaller partitions of one relation with an unchanged corresponding partition of another relation;

(d) updating the current set of execution time estimates by replacing the execution time estimates of the replaced jobs with execution time estimates for the replacement jobs;

(e) iteratively performing the steps (c) and (d) until there is no execution time estimate for any job in the current set of jobs which is greater than the sum of the execution time estimates divided by P;

(f) scheduling the current set of jobs among P processors using a minimum makespan optimization technique that minimizes a maximum running time on a longest running processor;

(g) estimating an amount of completion time skew which would result if P processors were to perform the current set of jobs as scheduled in step (f);

(h) comparing the estimated amount of skew with a skew standard;

(i) if the estimated skew meets the skew standard, skipping steps (j) through (o);

(j) if the estimated skew does not meet the skew standard, replacing a larger partition of the first and second relations with at least two smaller partitions, but not replacing any partitions formed through performing step (c)(2), to define replacement jobs for the job defined by the replaced partitions, each such replacement job consisting of a task of joining one of the smaller replacing partitions of the first relation with a corresponding smaller replacing partition of the second relation;

(k) updating the current set of execution time estimates by replacing the execution time estimates for the replacement jobs;

(l) updating scheduling of the current set of jobs among P processors so as to minimize estimated completion time skew;

(m) estimating an amount of completion time skew which would result if P processors were to perform the current set of jobs as scheduled in step (l);

(n) comparing the amount of skew estimates in step (m) with the skew standard;

(o) iteratively performing steps (j) through (n) until either the amount of skew meets the skew standard in step (n) or all partitions have been subpartitioned to a predetermined maximum extent; and (p) executing the current set of jobs as last scheduled using said P processors to join said two database relations on a common field with minimum completion time skew.

12. Apparatus in a database machine for joining first and second database relations on a common field in a parallel relational database environment having P processors linked by an interconnect network, said apparatus comprising:

(a) means for partitioning the first relation into a multiplicity of partitions and the second relation into a corresponding multiplicity of partitions such that each individual value in the common field corresponds uniquely to one of the partitions of the first relation and uniquely to the corresponding one of the partitions of the second relation to define a current set of jobs, each consisting of a task of joining a partition of the first relation with the corresponding partition of the second relation;

(b) means for scheduling a current set of jobs among P processors using a minimum makespan optimization technique that schedules said jobs such that a maximum running time on any processor is minimized;

(c) means for estimating an amount of completion time skew which would result if said P processors were to perform the current set of jobs as scheduled by said means for scheduling;

(d) means for comparing the estimated amount of skew with a skew standard; and (e) means for executing the current set of jobs as last scheduled using P processors to join said first and second database relations on a common field with minimum completion time skew if the estimated skew meets the skew standard as determined by said means for comparing.

13. The apparatus in said database machine recited in claim 12 wherein the partitioning by said means for iteratively partitioning results in larger and smaller partitions of the first and second relations, further comprising:

- (f) means for replacing one of the larger partitions of the first and second relations with at least two smaller partitions if the estimated skew does not meet the skew standard, thereby defining replacement jobs for the job defined by the replaced partitions, each such replacement job consisting of a task of joining one of the smaller replacing partitions of the first relation with the corresponding smaller replacing partition of the second relation;
- (g) first means for updating a current set of execution time estimates by replacing the execution time estimates of the replaced jobs with execution time estimates for the replacement jobs;
- (h) second means for updating the scheduling of the current set of jobs among P processors so as to minimize the estimated completion time skew;
- (i) second means for estimating the amount of completion time skew which would result if P processors were to perform the current set of jobs as scheduled by said second means for updating;
- (j) means for comparing the amount of completion time skew estimated by said second means for updating with the skew standard; and
- (k) said means for replacing, first and second means for updating, second means for estimating, and means for comparing iteratively operating until either the amount of skew meets the skew standard or all partitions have been subpartitioned to a predetermined maximum extent.

14. The apparatus in said database machine recited in claim 13 said means for iteratively partitioning further comprises:

- (l) third means for estimating a time it will take for a single processor to accomplish each of said jobs, said estimates forming a current set of execution time estimates;
- (m) means for subpartitioning any partitions which correspond to jobs having an execution time estimate which is greater than the sum of the execution time estimates divided by P; and
- (n) third means for updating the current set of execution time estimates by replacing the execution time estimates of the replaced jobs with execution time estimates for the replacement jobs;
- (o) said third means for estimating, means for subpartitioning and third means for updating iteratively operating until there is no execution time estimate for any job in the current set of jobs which is greater than the sum of the execution time estimates divided by P.

* * * * *